United States Patent
Yoon

(10) Patent No.: US 6,732,968 B2
(45) Date of Patent: May 11, 2004

(54) PRETENSIONER STRUCTURE FOR A SAFETY BELT OF AN AUTOMOBILE

(75) Inventor: Jong-Young Yoon, Kyoungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/102,618

(22) Filed: Mar. 19, 2002

(65) Prior Publication Data

US 2003/0001041 A1 Jan. 2, 2003

(30) Foreign Application Priority Data

Jul. 2, 2001 (KR) .................................. 2001-39320

(51) Int. Cl.⁷ .............................................. B60R 22/46
(52) U.S. Cl. ..................... 242/382.6; 280/806; 297/476
(58) Field of Search ............................. 242/374, 382.6; 280/806; 297/476, 478, 480

(56) References Cited

U.S. PATENT DOCUMENTS

| | | | | |
|---|---|---|---|---|
| 4,470,557 A | * | 9/1984 | Ernst | 242/382.6 |
| 5,190,239 A | * | 3/1993 | Yoshida et al. | 242/374 |
| 5,248,110 A | | 9/1993 | Hiruta et al. | |
| 5,326,042 A | * | 7/1994 | Nishizawa et al. | 242/374 |
| 5,364,168 A | * | 11/1994 | Nishizawa et al. | 297/476 |
| 6,145,881 A | * | 11/2000 | Miller et al. | 280/806 |
| 2003/0029661 A1 | * | 2/2003 | Motozawa | 180/274 |

* cited by examiner

Primary Examiner—Kathy Matecki
Assistant Examiner—Sang Kim
(74) Attorney, Agent, or Firm—Morgan Lewis & Bockius LLP

(57) ABSTRACT

Disclosed is a seat belt pretensioner for a vehicle wherein a spool is mounted in such a way that it cannot be further released at the onset of a car accident but can push itself downwardly in a fixed state along the length-wise direction of a retractor and thus can effectively rewind a seat belt with ease. To serve this purpose the seat belt pretensioner of the present invention comprises a retractor cover wherein sliding guides are mounted both on right and left sides, a spool mounted in such a manner that a seat belt is wound up with an elastic support and is able to slide along the sliding guide, and a piston structure, being mounted on the upper part of said cover, pushes said spool downwardly by the explosion force of explosives.

8 Claims, 7 Drawing Sheets

PRETENSIONER STRUCTURE FOR A SAFETY BELT OF AN AUTOMOBILE

FIELD OF THE INVENTION

The present invention relates to a seat belt pretensioner for a vehicle. More particularly, the seat belt pretensioner for a vehicle includes a spool, onto which a seat belt is wound, wherein the spool is moved downward at the onset of an accident by means of an explosive force.

BACKGROUND OF THE INVENTION

A vehicle seat belt is a crucial part of a vehicle's safety components. Seat belts assist in securing the safety of the driver and passengers at the onset of a crash and have become a mandatory feature for vehicles. Seat belts, once fastened, preferably do not create unnecessary discomfort for a driver nor restrict too tightly the body of a driver and passengers, thus minimizing bodily damage incurred during car accidents. One important feature of the seat belt is the seat belt pretensioner. Pretensioners often use an explosive force in activation to tighten the seat belt a prescribed amount during firing of the explosive force. The pretensioner is often positioned on the retractor which is wound up by the elastic support of a seat belt.

FIG. 3a shows the structure of a conventional pretensioner. In this configuration, a clutch 110 is mounted on a cover 100 and a seat belt is located at one end of a spool. The clutch rewinds the seat belt by rotating it in a reverse direction. The force for reversely rotating the seat belt if provided by a piston structure 120, which slides in response to an explosive force.

FIG. 3b shows the structure of another type of a conventional pretensioner. The structure of the pretensioner in FIG. 3b is such that one end of a spool, upon which a seat belt is wound up by the elastic support, protrudes outwardly from a position and a home gear 130 is mounted on the protruded end of the spool. A ball supply line 131 wraps around the home gear 130, thereby enabling the balls 132, which fill along the ball supply line 131, to reversely rotate the home gear 130.

FIG. 3c shows the structure of still another type of conventional pretensioner. The structure of the pretensioner in FIG. 3c is such that a seat belt extends from one end of a wound up spool 140. At the extended end a clamp wire 141 is installed. During an accident, an explosive force pulls the clamp wire 141 upwards, generating a frictional force which rotates the spool 140 inward.

FIG. 3d also shows the structure of another type of conventional pretensioner disclosed in U.S. Pat. No. 5,248,110. The structure of the pretensioner in FIG. 3d is such that a gear 150 is mounted on the spool 140 such that the gear 150 is rotated by the explosive force, thereby rotating the spool 140.

However, the spools in these conventional pretensioners have disadvantages in that they are forced to rotate and therefore the spool structures become rather complex and manufacturing costs become very high. Further, an enormous force is required to rotate the spool and wind up the belt.

SUMMARY OF THE INVENTION

The present invention provides a seat belt pretensioner for a vehicle wherein a spool is mounted in such a way that it cannot be further released at the onset of a car accident. However, the spool is pushed downward in a fixed state along a length-wise direction of a retractor and thus effectively partially rewind a seat belt when activated.

A seat belt pretensioner according to an embodiment of the present invention comprises a retractor cover wherein sliding guides are formed on both right and left sides. A spool is mounted in such a manner that a seat belt is wound up with an elastic support and is able to slide along a sliding guide. Furthermore a piston structure, mounted on the upper part of the cover, pushes the spool downwardly by an explosion force of explosives.

The sliding guides of the present invention are preferably mounted in parallel with the direction the seat belt is wound up or released.

The spool of the present invention is preferably equipped with a latch to prevent the release of a seat belt at the onset of a car accident.

The piston structure of the present invention preferably comprises an explosive powder chamber, which is mounted on the upper part of the cover and provides explosion gas to both left and right, and a pair of cylinders connected to said explosive powder chamber wherein each cylinder is positioned on the sides of the cover to be in parallel with the sliding guides, and wherein the internal end of each cylinder is connected to a spool.

According to another preferred embodiment of the invention, a seat belt pretensioner for a vehicle comprises a support member having a top and bottom, a seat belt spool having ends slideably supported by the support member, and a piston system acting on the spool to force the spool toward the bottom of the support member in response to a vehicle accident. Preferably, the support member comprises a retractor cover of a seat belt retractor mechanism. In a further preferred embodiment, a seat belt extends the spool in a predetermined orientation toward the spool ends, with the guide members being oriented at least substantially in parallel with the seat belt orientation. The piston system preferably comprises an explosive chamber, first and second cylinders communicating with the explosive chamber on opposite sides of the support member, and first and second pistons. Each piston is disposed in one cylinder and each is linked to an end of the spool. When an explosion is triggered in the explosive chamber, the explosive force communicates with the cylinders to act on the pistons to force the spool down, away from the extension of the seat belt.

DETAILED DESCRIPTION OF THE PREFERRED EMBODIMENTS

The present invention is explained in more detail with reference to the drawings as set forth hereunder.

Figure 1:
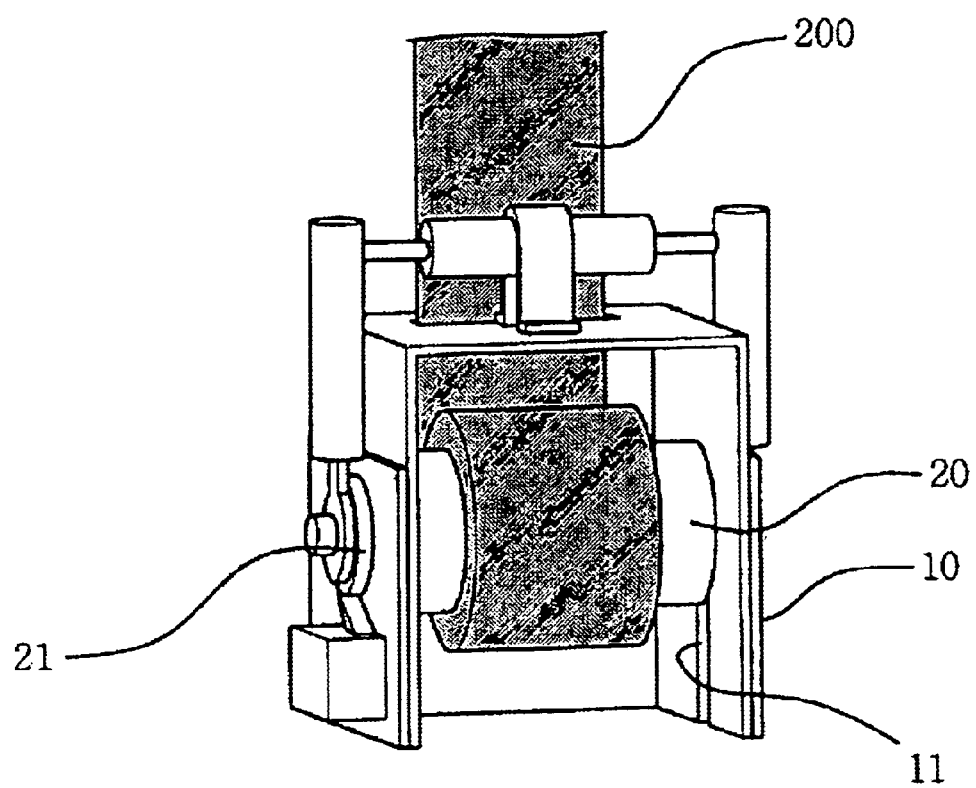
FIG. 1 is a perspective view of a seat belt pretensioner for a vehicle of the present invention.
Figure 2A:
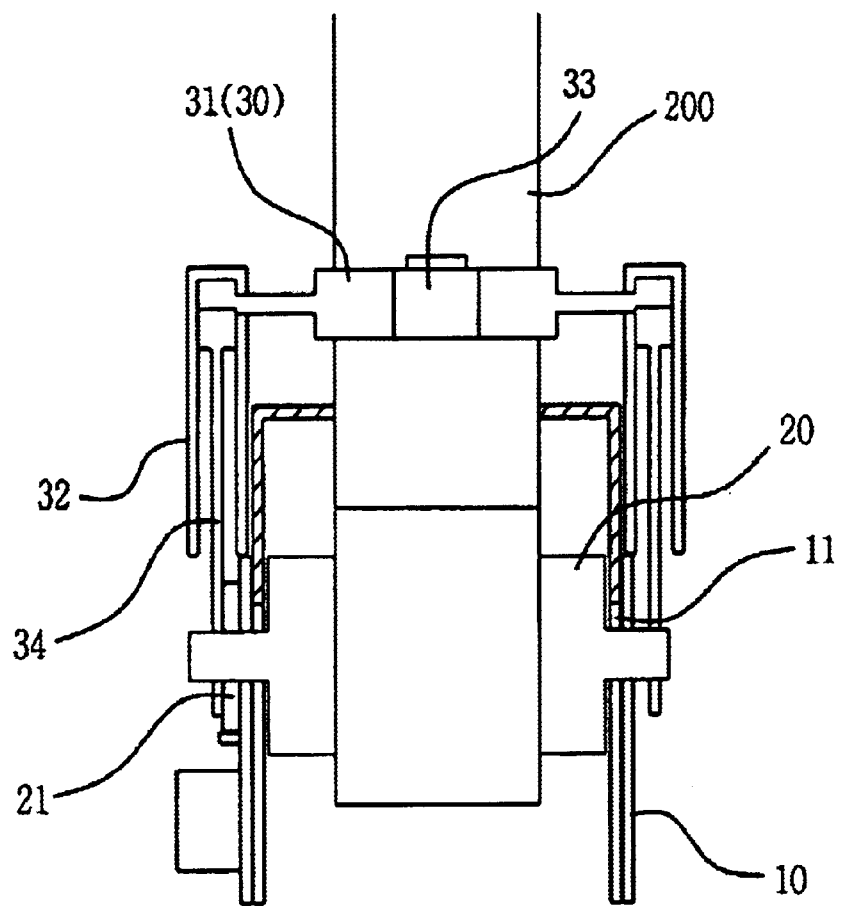
FIGS. 2a and 2b are cross-sectional views of a seat belt pretensioner for a vehicle of the present invention.
Figure 2B:
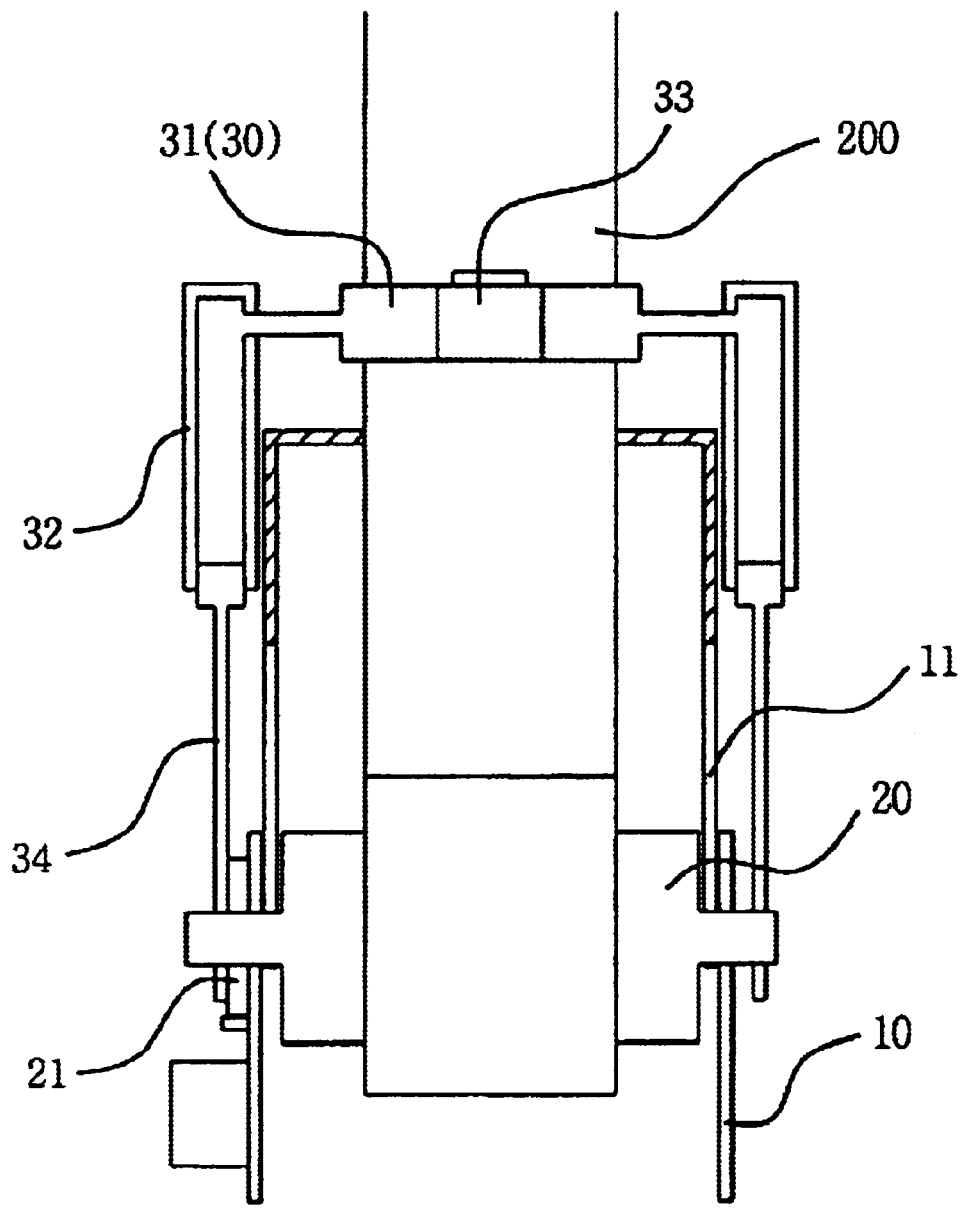
Figure 3A:
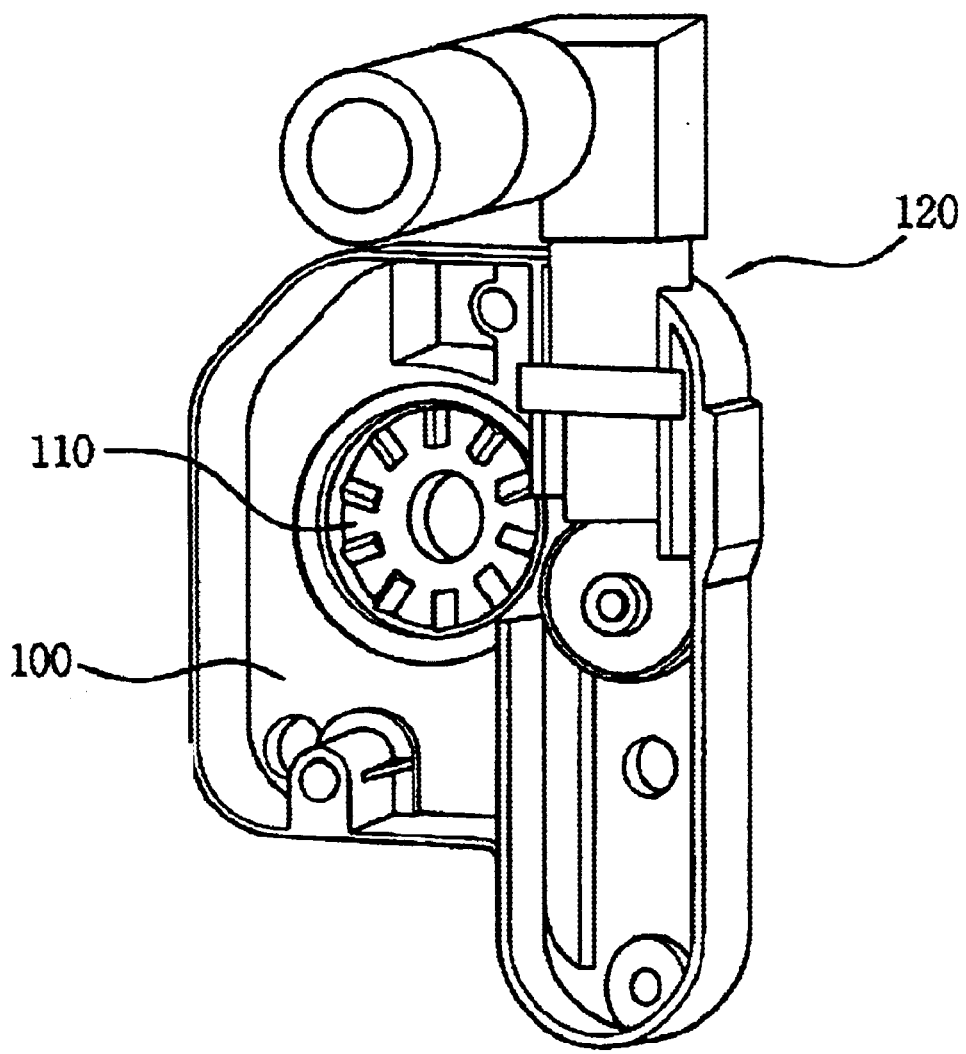
FIG. 3a is a perspective view of a conventional seat belt pretensioner for a vehicle.
Figure 3B:
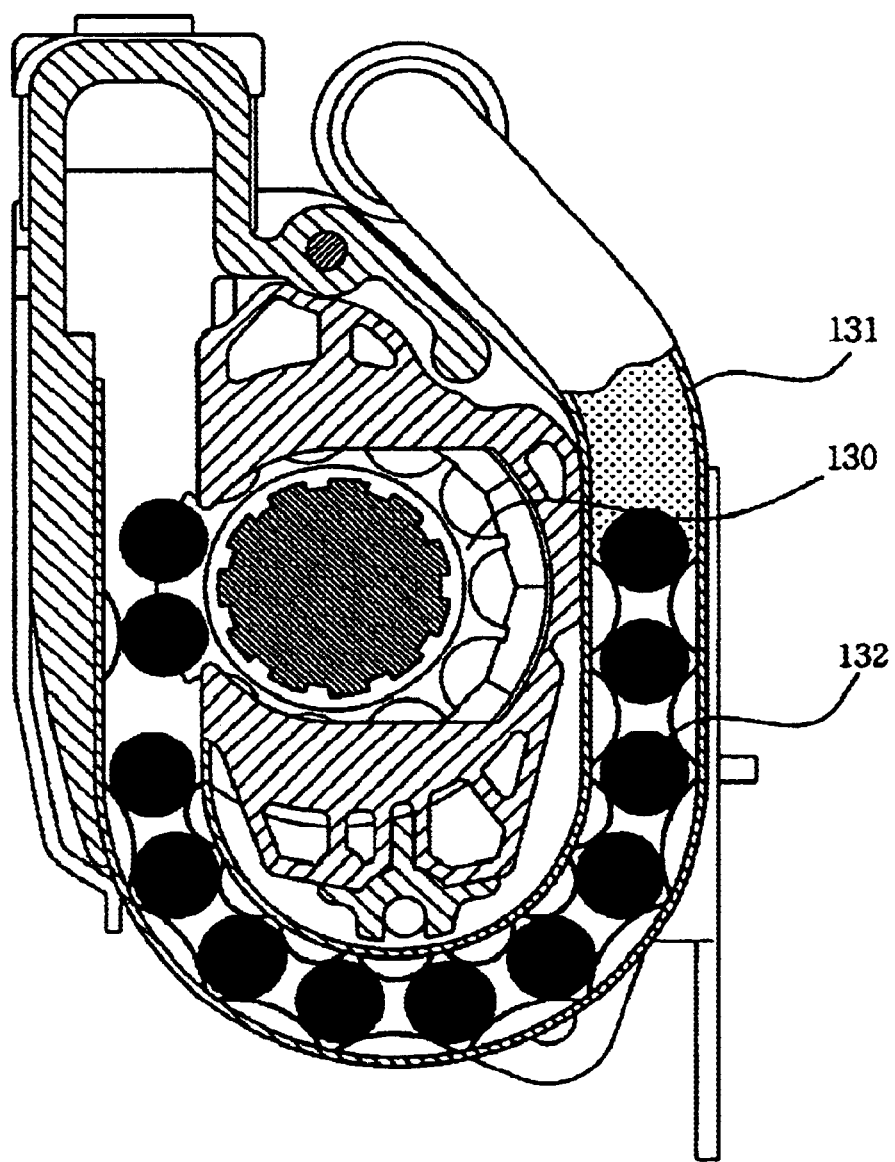
FIGS. 3b–3d are cross-sectional views of conventional seat belt pretensioners for a vehicle.
Figure 3C:
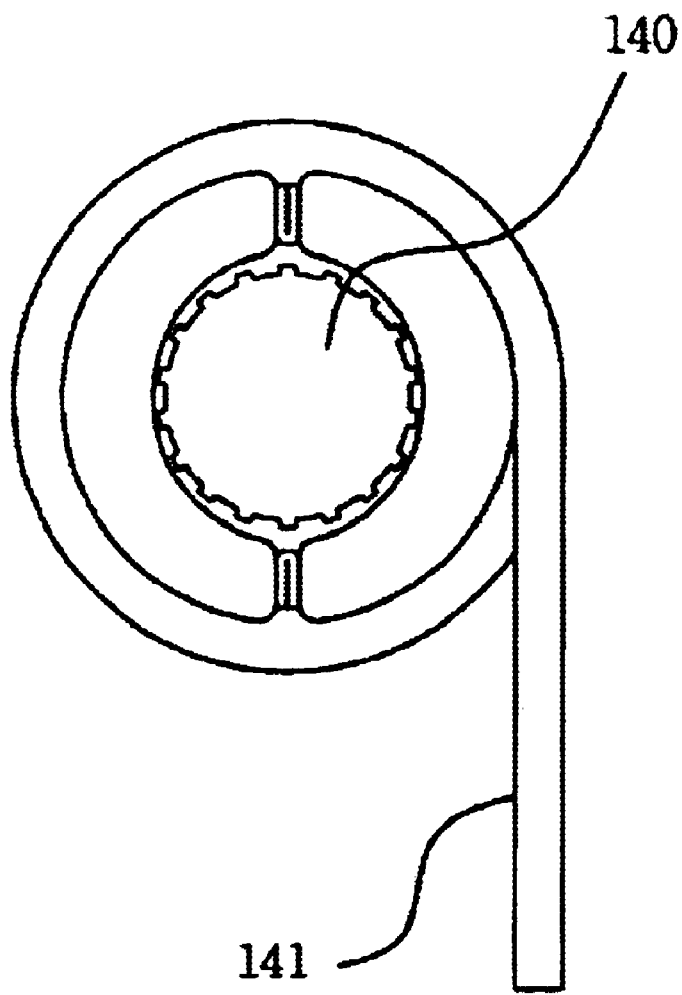
Figure 3D:
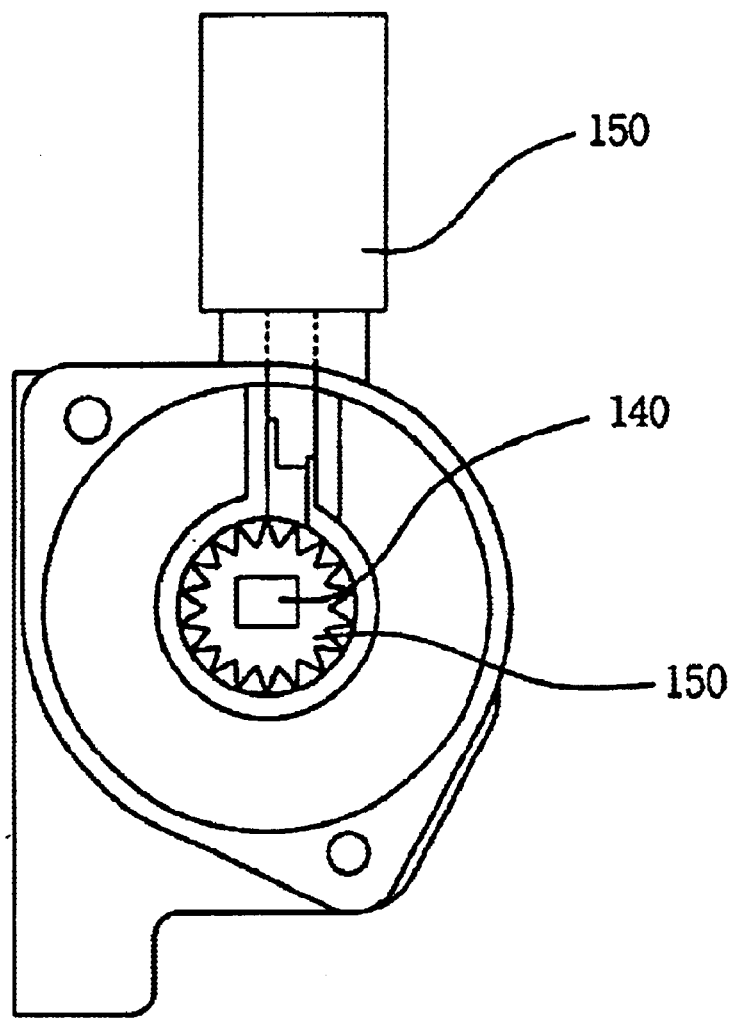

As shown in FIG. 1, a seat belt pretensioner according to the invention is so designed that it can wind up a seat belt at the onset of car accident. In particular, spool 20, in a state where no more rotation is possible; can be lowered at the onset of a car accident to generate the effect of rewinding the seat belt 200, or further shortening the seat belt 200.

The pretensioner of the present invention includes a retractor cover 10 and on both sides of said retractor cover 10 are mounted vertical sliding guides 11. Sliding guides 11 are where both sides of spool 20 are moveably supported. Guides 11 may be oriented in a straight line with a right angle or at varying degrees of angles with respect to the surface of said retractor cover 10. In one embodiment of the present invention, said sliding guides 11 preferably line up in parallel with the direction from which the seat belt 200 is released.

Spool 20, which is mounted on the retractor and serves as a place to wind up the seat belt 200, is supported elastically. Spool 20 extends out on both ends and is mounted on the cover 10 so that the extended ends protrude outside of the sliding guides 11. Specifically, spool 20 is provided with a latch 21 in order to prevent further release of the seat belt 200. Here, the latch 21 does not have to include a special feature but can be any type of conventional latch as long as it can serve the role of fixing the spool 20 for seat belts.

Piston structure 30 provides operational force so that spool 20 can be slid into a lower position in a fixed state. Piston structure 30 comprises an explosive powder chamber 31, which is mounted on the upper part of cover 10 and cylinder parts 32, each of which is mounted on both sides of cover 10, respectively. In particular, explosive powder chamber 31 contains explosive powder 33 so that it can explode upon sensing a car accident and cylinder parts 32 are designed to expand from the explosive gas as the explosive powder 33 explodes to both left and right directions.

Cylinder parts 32 are installed on sides of cover 10 and are preferably lined up in parallel with sliding guides 11. In addition, cylinder parts 32 are preferably installed with an upper portion connected to both ends of explosive powder chamber 31 so that they are simultaneously provided with explosive gas. Each cylinder 34, established inside of cylinder parts 32, is connected to the extended ends of spool 20 so that it can rotate in its designated location. Therefore, spool 20 can be prevented from rotating by latch 21 upon the occurrence of a car accident and at the same time cylinders 34 move downwardly from the explosion of explosive powder 33, which then results in lowering spool 20 to a fixed state position, thus pulling the belt 20.

The present invention thus provides a number of advantages. For example, although being simple in its structural features, the pretensioner directly delivers explosive force to the spool for a seat belt and pulls up the seat belt. Also, because the explosive gas directly acts on the spool, the effect of lowering the spool (i.e., equivalent to the effect of rotating the spool in the conventional pretensioner) can be more effective. In addition, because its structure is so simple the total number of parts can be reduced thus reducing unit production cost as well as enhancing product quality. These and other advantages will be apparent to persons skilled in the art based on the preferred embodiment of the present invention described herein, the scope of the invention being defined by the following claims.

What is claimed is:

1. A seat belt pretensioner for a vehicle, comprising:

a retractor cover wherein sliding guides are positioned on both right and left sides;

a spool mounted to slide along the sliding guides; and a piston structure, being mounted on an upper part of said cover, pushing said spool downwardly by the explosion force of explosives.

2. The seat belt pretensioner for a vehicle according to claim 1, wherein said sliding guides are mounted in such a way that they lie in parallel with a direction in which said seat belt is wound up or released.

3. The seat belt pretensioner for a vehicle according to claim 1, wherein said spool is equipped with a latch which prevents the release of said seat belt in a car accident.

4. The seat belt pretensioner for a vehicle according to claim 1, wherein said piston structure consists of:

an explosive powder chamber which is mounted on the upper part of said cover and provides explosion gas to both left and right sides; and a pair of cylinders connected to said explosive powder chamber wherein each cylinder is positioned on a side of said cover in parallel with said sliding guide, wherein an internal end of said each cylinder is connected to said spool.

5. A seat belt pretensioner for a vehicle, comprising:

a support member having a top and bottom;

a seat belt spool having ends slideably supported by the support member; and a piston system acting on said spool to force said spool toward the bottom of the support member in response to a vehicle accident.

6. The pretensioner of claim 5, wherein said support member comprises a retractor cover of a seat belt retractor mechanism.

7. The pretensioner of claim 5, wherein a seat belt extends from said spool in a predetermined orientation toward the top of the support member and said support member includes guide members slideably receiving said spool ends, the guide members being oriented at least substantially in parallel with said seat belt orientation.

8. The pretensioner of claim 7, wherein said pistons system comprises:

an explosive chamber;

first and second cylinders communicating with said chamber on opposite sides of the support member; and first and second pistons, one disposed in each said cylinder and each being linked to an end of said spool, wherein an explosion triggered in said chamber communicates with the cylinders to act on the pistons to force said spool down, away from the extension of the seat belt.

* * * * *